US012526809B2

United States Patent
Yang et al.

(10) Patent No.: US 12,526,809 B2
(45) Date of Patent: Jan. 13, 2026

(54) METHOD FOR HYBRID AUTOMATIC REPEAT REQUEST HARQ FEEDBACK, TERMINAL, AND NETWORK DEVICE

(71) Applicant: VIVO MOBILE COMMUNICATION CO., LTD., Guangdong (CN)

(72) Inventors: Ang Yang, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 701 days.

(21) Appl. No.: 17/402,913

(22) Filed: Aug. 16, 2021

(65) Prior Publication Data
US 2021/0378003 A1 Dec. 2, 2021

Related U.S. Application Data

(63) Continuation of application No. PCT/CN2020/075290, filed on Feb. 14, 2020.

(30) Foreign Application Priority Data

Feb. 15, 2019 (CN) .......................... 201910117883.7

(51) Int. Cl.
H04W 72/23 (2023.01)
H04L 1/1812 (2023.01)
H04L 1/1867 (2023.01)
H04L 5/00 (2006.01)
H04W 72/0446 (2023.01)
(Continued)

(52) U.S. Cl.
CPC ........... *H04W 72/23* (2023.01); *H04L 1/1812* (2013.01); *H04L 1/1896* (2013.01); *H04L 5/0053* (2013.01); *H04L 5/0055* (2013.01); *H04L 5/0094* (2013.01); *H04W 72/0446* (2013.01);
(Continued)

(58) Field of Classification Search
CPC ............. H04W 72/23; H04W 72/0446; H04W 74/006; H04W 72/232; H04W 72/21; H04W 28/06; H04W 92/18; H04W 72/1263; H04W 72/1268; H04L 1/1812; H04L 5/0055; H04L 5/0053; H04L 1/1864; H04L 5/0094; H04L 1/1854;
(Continued)

(56) References Cited

U.S. PATENT DOCUMENTS 12,177,827 B2 * 12/2024 Wei ...................... H04W 72/23
2011/0194511 A1 8/2011 Chen et al.
(Continued)

FOREIGN PATENT DOCUMENTS

CN 102726110 A 10/2012
CN 109155703 A 1/2019
(Continued)

OTHER PUBLICATIONS

CATT, "On PHY enhancements for Rel-16 URLLC", 3GPP TSG RAN WG1 Meeting #94bis, R1-1810551, Chengdu, China, Oct. 8-12, 2018.
(Continued)

*Primary Examiner* — Nam T Huynh
(74) *Attorney, Agent, or Firm* — Price Heneveld LLP (57) ABSTRACT

A method for HARQ feedback, a terminal, and a network device are provided. The method includes: obtaining DCI in a GC-PDCCH; and feeding back HARQ acknowledgement information according to the DCI.

14 Claims, 3 Drawing Sheets

(51) Int. Cl.
*H04W 72/21* (2023.01)
*H04W 72/232* (2023.01)

(52) U.S. Cl.
CPC ........ *H04W 72/21* (2023.01); *H04W 72/232* (2023.01)

(58) Field of Classification Search
CPC ..... H04L 1/1896; H04L 1/1861; H04L 5/001; H04L 1/1819; H04L 5/0044
See application file for complete search history.

(56) References Cited

U.S. PATENT DOCUMENTS

| 2019/0075563 | A1 | 3/2019 | Babaei et al. | |
| 2020/0145148 | A1* | 5/2020 | Yeo | H04L 1/1685 |
| 2021/0314093 | A1 | 10/2021 | Mu | |
| 2022/0116970 | A1* | 4/2022 | Gao | H04L 27/26025 |

FOREIGN PATENT DOCUMENTS

| JP | 201320084 A | 5/2013 | |
| WO | 2011100326 A1 | 8/2011 | |
| WO | 2019028844 A1 | 2/2019 | |
| WO | 2019028857 A1 | 2/2019 | |
| WO | WO-2020029189 A1 * | 2/2020 | ........... H04L 1/1685 |

OTHER PUBLICATIONS

Huawei, HARQ feedback indication design for UL grant-free transmission, 3GPP TSG RAN WG1 Meeting #90bis, R1-1717092, Prague, Czech Republic, Oct. 9-13, 2017.
Huawei, "Remaining details on group-common PDCCH", 3GPP TSG RAN WGI Meeting 90bis, RI-1717063, Prague, Czech Republic, Oct. 9-13, 2017.

* cited by examiner

Transmit downlink control information DCI to a terminal through a group common physical downlink control channel GC-PDCCH, where the DCI is used to trigger the terminal to feed back HARQ acknowledgement information — 51

METHOD FOR HYBRID AUTOMATIC REPEAT REQUEST HARQ FEEDBACK, TERMINAL, AND NETWORK DEVICE

CROSS-REFERENCE TO RELATED APPLICATIONS

This application is continuation application of PCT International Application No. PCT/CN2020/075290 filed on Feb. 14, 2020, which claims priority to Chinese Patent Application No. 201910117883.7 filed in China on Feb. 15, 2019, the disclosures of which are incorporated herein by reference in their entireties.

TECHNICAL FIELD

This disclosure relates to the field of communications technologies, and in particular, to a method for hybrid automatic repeat request (HARQ) feedback, a terminal, and a network device.

BACKGROUND

For transmission in an unlicensed band, before information is transmitted, a terminal or a network device needs to perform clear channel assessment (CCA) or extended clear channel assessment (eCCA) to monitor a channel, that is, to perform energy detection (ED). When energy is lower than a threshold, the channel is determined to be idle, and then transmission can be started. Because the unlicensed band is shared by multiple technologies or multiple transmission nodes, such contention-based access manner leads to uncertainty of a channel availability time. A channel may be unavailable at a time location specified by a network device, so a terminal cannot transmit corresponding hybrid automatic repeat request acknowledgement information.

SUMMARY

Embodiments of this disclosure provide a method for hybrid automatic repeat request (HARQ) feedback, a terminal, and a network device.

According to a first aspect, an embodiment of this disclosure provides a method for hybrid automatic repeat request (HARQ) feedback, applied to a terminal and including:

obtaining downlink control information (DCI) in a group common physical downlink control channel (GC-PDCCH); and feeding back HARQ acknowledgement information according to the DCI.

According to a second aspect, an embodiment of this disclosure further provides a terminal, including:

a first obtaining module, configured to obtain downlink control information (DCI) in a group common physical downlink control channel (GC-PDCCH); and a feedback module, configured to feed back HARQ acknowledgement information according to the DCI.

According to a third aspect, an embodiment of this disclosure provides a terminal. The terminal includes a processor, a memory, and a computer program stored in the memory and capable of running on the processor. When the computer program is executed by the processor, the steps of the foregoing method for hybrid automatic repeat request (HARQ) feedback are implemented.

According to a fourth aspect, an embodiment of this disclosure provides a method for hybrid automatic repeat request (HARQ) feedback, applied to a network device and including:

transmitting downlink control information (DCI) to a terminal through a group common physical downlink control channel (GC-PDCCH), where the DCI is used to trigger the terminal to feed back HARQ acknowledgement information.

According to a fifth aspect, an embodiment of this disclosure provides a network device, including:

a first transmitting module, configured to transmit downlink control information (DCI) to a terminal through a group common physical downlink control channel (GC-PDCCH), where the DCI is used to trigger the terminal to feed back HARQ acknowledgement information.

According to a sixth aspect, an embodiment of this disclosure further provides a network device. The network device includes a processor, a memory, and a computer program stored in the memory and capable of running on the processor. When the computer program is executed by the processor, the steps of the foregoing method for hybrid automatic repeat request (HARQ) feedback are implemented.

According to a seventh aspect, an embodiment of this disclosure provides a computer-readable storage medium, where the computer-readable storage medium stores a computer program, and when the computer program is executed by a processor, the steps of the foregoing method for hybrid automatic repeat request (HARQ) feedback are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings.

DESCRIPTION OF EMBODIMENTS

Exemplary embodiments of this disclosure will be described below in more detail with reference to the accompanying drawings. Although the accompanying drawings show exemplary embodiments of this disclosure, it should be understood that this disclosure may be implemented in various forms and should not be limited by the embodiments described herein. Instead, these embodiments are provided so that this disclosure will be better understood, and the scope of this disclosure can be fully conveyed to those skilled in the art.

The terms "first", "second", and the like in this specification and claims of this application are used to distinguish between similar objects instead of describing a specific order or sequence. It should be understood that the terms used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. The term "and/or" used in this specification and claims indicates at least one of connected objects.

Technologies described herein are not limited to Long Term Evolution (LTE)/LTE-Advanced (LTE-A) systems, but may also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often used interchangeably. Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also have other applications than the application in an NR system.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
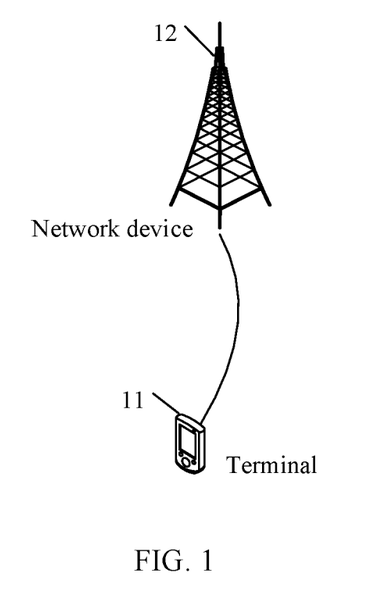
FIG. 1 is a block diagram of a mobile communications system to which the embodiments of this disclosure are applicable.

Referring to FIG. 1, FIG. 1 is a block diagram of a wireless communications system to which the embodiments of this disclosure are applicable. The wireless communications system includes a terminal 11 and a network device 12. The terminal 11 may also be referred to as a terminal device or user equipment (UE). The terminal 11 may be a terminal-side device such as a mobile phone, a tablet computer, a laptop computer, a personal digital assistant (PDA), a mobile Internet device (MID), a wearable device, or a vehicle-mounted device. It should be noted that a specific type of the terminal 11 is not limited in the embodiments of this disclosure. The network device 12 may be a base station or a core network. The base station may be a 5G base station or a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that only a base station in an NR system is used as an example in the embodiments of this disclosure, but a specific type of the base station is not limited.

Under control of a base station controller, the base station may communicate with the terminal 11. In various examples, the base station controller may be a part of the core network or some base stations. Some base stations may communicate control information or user data with the core network by using backhaul links. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, each communications link may transmit multi-carrier signals modulated by using various radio technologies. Each modulated signal may be transmitted on different carriers and may carry control information (for example, a reference signal or a control channel), overhead information, data, and the like.

The base station may perform wireless communication with the terminal 11 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cell or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink (UL) for carrying uplink transmission (for example, from the terminal 11 to the network device 12) or a downlink (DL) for carrying downlink transmission (for example, from the network device 12 to the terminal 11). UL transmission may alternatively be referred to as reverse link transmission, and DL transmission may alternatively be referred to as forward link transmission. Downlink transmission may be implemented by using a licensed band, an unlicensed band, or both. Similarly, uplink transmission may be implemented by using a licensed band, an unlicensed band, or both.

Figure 2:
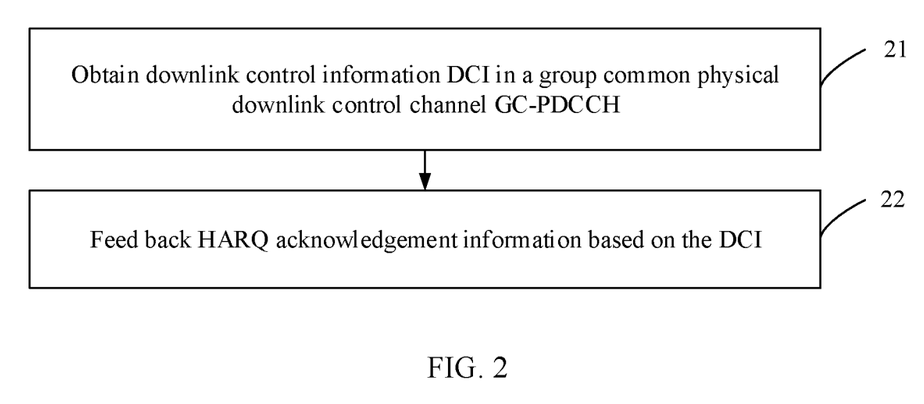
FIG. 2 is a schematic flowchart of a method for hybrid automatic repeat request (HARQ) feedback on a terminal side according to an embodiment of this disclosure.

As shown in FIG. 2, an embodiment of this disclosure provides a method for hybrid automatic repeat request (HARQ) feedback, applied to a terminal. The method includes the following steps.

Step 21: Obtain downlink control information (DCI) in a group common physical downlink control channel (GC-PDCCH).

Different downlink control information (DCI) formats are defined for group common physical downlink control channels (GC-PDCCH) of different purposes. For example, a GC-PDCCH supported by a new radio (NR) system includes but is not limited to: a slot format indicator (SFI) used to indicate a subframe format of one slot or a plurality of slots for a group of terminals; a preemption indication used to indicate a time-frequency resource interrupted due to service transmission in a slot for a group of terminals; and power control used to configure a power control instruction for a group of terminals. The GC-PDCCH in this embodiment of this disclosure further includes: an indication of feeding back HARQ acknowledgement information, used to indicate a group of terminals whether to feed back the HARQ acknowledgement information.

Step 22: Feed back the HARQ acknowledgement information according to the DCI.

The terminal decodes the DCI and determines whether feeding back the HARQ acknowledgement information (or referred to as HARQ feedback information) is triggered. The HARQ acknowledgement information includes a HARQ-ACK or a HARQ-NACK. If feeding back the HARQ acknowledgement information is triggered, the terminal feeds back the HARQ acknowledgement information through a corresponding physical uplink control channel (PUCCH).

The NR system supports a plurality of PUCCH formats, for example, may support a short PUCCH format with a length of 1 or 2 symbols or support a long PUCCH format with a length of 4 to 14 symbols. For a specific supported waveform, a discrete Fourier transform spread spectrum orthogonal frequency division multiplex (DFT-S-OFDM) waveform may be supported, and a cyclic prefix orthogonal frequency division multiplex (CP-OFDM) waveform may also be supported. The PUCCH formats that can be supported by the NR system are shown in Table 1 below.

In Table 1, PUCCH format 0 and PUCCH format 2 belong to the short PUCCH format; and PUCCH format 1, PUCCH format 3, and PUCCH format 4 belong to the long PUCCH format.

In an embodiment of this disclosure, step 21 may be implemented in the following manner: receiving, by using radio resource control (RRC) signaling, a radio network temporary identity (RNTI) used to trigger feeding back the HARQ acknowledgement information; and searching for corresponding DCI in the GC-PDCCH based on the RNTI. The RRC signaling further includes: GC-PDCCH monitoring configuration information, such as a GC-PDCCH time-frequency resource. In other words, the terminal may obtain the GC-PDCCH monitoring configuration information by receiving an RRC configuration. Based on the RRC signaling configuration, the terminal uses the RNTI configured in the RRC signaling to search for the corresponding DCI on the GC-PDCCH time-frequency resource.

Further, the RRC signaling may further include: a terminal identifier $ID_i$ of a terminal in a terminal group (UE group) and a maximum quantity n of terminals included in the terminal group. The terminal may determine a DCI size based on n, and correspondingly, the terminal may use the RNTI configured in the RRC signalling to search for DCI corresponding to the DCI size on the GC-PDCCH time-frequency resource.

In addition, a concept of PUCCH resource set (RESET) is introduced in the NR system. After a radio resource control (RRC) connection is established, in order to determine a PUCCH resource, a maximum of 4 RESETs may be configured, and a maximum of 4 or 8 resources may be configured in each RESET. In a case that 8 resources are configured, an implicit PUCCH resource indication scheme is required. Each resource in the RESET may be configured in the RRC signaling based on a parameter list in Table 2.

TABLE 1

PUCCH formats

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

TABLE 2

PUCCH resources pre-configured by RRC

| | | PUCCH Format 0 | PUCCH Format 1 | PUCCH Format 2 | PUCCH Format 3 | PUCCH Format 4 |
|---|---|---|---|---|---|---|
| Start symbol 1 | Configurable or not | √ | √ | √ | √ | √ |
| | Value range | 0-13 | 0-10 | 0-13 | 0-10 | 0-10 |
| Quantity of symbols occupied in one slot | Configurable or not | √ | √ | √ | √ | √ |
| | Value range | 1, 2 | 4-14 | 1, 2 | 4-14 | 4-14 |
| Index for identifying a start physical resource block | Configurable or not | √ | √ | √ | √ | √ |
| | Value range | 0-274 | 0-274 | 0-274 | 0-274 | 0-274 |
| Quantity of physical resource block | Configurable or not | N.A. | N.A. | √ | √ | N.A. |
| | Value range | N.A. (a default value is 1) | N.A. (a default value is 1) | 1-16 | 1-6, 8-10, 12, 15, 16 | N.A. (a default value is 1) |
| Frequency hopping supported or not | Configurable or not | √ | √ | √ | √ | √ |
| | Value range | On (On)/off | On/Off | On/Off (only | On/Off | On/Off |

TABLE 2-continued

| | | PUCCH resources pre-configured by RRC | | | | |
|---|---|---|---|---|---|---|
| | | PUCCH Format 0 | PUCCH Format 1 | PUCCH Format 2 | PUCCH Format 3 | PUCCH Format 4 |
| | | (Off) (only for 2 symbols only for 2 symbols) | | for 2 symbols) | | |
| Second-hop frequency-domain resource in a case that frequency hopping is supported | Configurable or not Value range | √ 0-274 | √ 0-274 | √ 0-274 | √ 0-274 | √ 0-274 |
| Initial cyclic shift index | Configurable or not Value range | √ 0-11 | √ 0-11 | N.A. N.A. | N.A. 0-11 | N.A. 0-11 |
| Time-domain orthogonal mask index | Configurable or not Value range | N.A. N.A. | √ 0-6 | N.A. N.A. | N.A. N.A. | N.A. N.A. |
| Length of pre-coding (Pre-) DFT OCC | Configurable or not Value range | N.A. N.A. | N.A. N.A. | N.A. N.A. | N.A. N.A. | √ 2, 4 |
| Pre-DFT OCC index | Configurable or not Value range | N.A. N.A. | N.A. N.A. | N.A. N.A. | N.A. N.A. | √ 0, 1, 2, 3 |

Further, the DCI in this embodiment of this disclosure may include but is not limited to at least one of the following information:

1. Quantity of time-domain transmission units between feedback of the HARQ acknowledgement information and the DCI, such as a quantity K1 of slots between feedback of the HARQ acknowledgement information (feedback of a HARQ-ACK) and the DCI.
2. Physical uplink control channel (PUCCH) resource information for feeding back the HARQ acknowledgement information, where the DCI in the GC-PUCCH may carry PUCCH resource information for feeding back HARQ acknowledgement information by each terminal in the terminal group.

The PUCCH resource information herein includes but is not limited to: at least one of a time-domain resource, a frequency-domain resource, a code-domain resource, and a spatial resource that are for feeding back the HARQ acknowledgement information. The time-domain resource includes: a location of a start symbol of the PUCCH carrying the HARQ acknowledgement information, duration of the PUCCH carrying the HARQ acknowledgement information, and so on. The frequency-domain resource includes: a location of a start physical resource block (PRB) of the PUCCH carrying the HARQ acknowledgement information, information about a start interlace, information about a start sub-resource block (sub-PRB) within the interlace, and so on. The code-domain resource includes: information about a start code of the PUCCH carrying the HARQ acknowledgement information, and so on. The spatial resource includes: precoding information of the PUCCH carrying the HARQ acknowledgement information, and so on.

Further, the terminal may determine, based on the PUCCH resource information in the DCI, whether feeding back the HARQ acknowledgement information is triggered, and such indication manner is an implicit indication manner. Specifically, after step 21, the method further includes: in a case that a candidate PUCCH indicated by the PUCCH resource information in the DCI is in a special state with no configured resource, determining not to feed back the HARQ acknowledgement information. Correspondingly, the special state with no configured resource can be supported in candidate PUCCH resource information configured by RRC, for example, a specific piece of candidate PUCCH resource information indicates that duration of the PUCCH is 0. In this case, when duration of the candidate PUCCH indicated by the PUCCH resource information in the DCI is 0, the terminal determines not to feed back the HARQ acknowledgement information. In addition, in a case that the candidate PUCCH indicated by the PUCCH resource information in the DCI is not in a special state with no configured resource, the terminal may feed back the HARQ acknowledgement information on the indicated PUCCH resource.

3. Indication information of whether to trigger feeding back the HARQ acknowledgement information. Correspondingly, the terminal may determine, based on an indication of the indication information, whether feedback of the HARQ acknowledgement information needs to be triggered, and such indication manner is an explicit indication manner. The DCI may indicate whether all terminals in the terminal group are to feed back the HARQ acknowledgement information. As an example, the indication information may be an n-bit bitmap, and n is a quantity of terminals corresponding to the GC-PUCCH. Correspondingly, the terminal finds, from the n-bit bitmap, an indication bit corresponding to its own terminal identifier to determine whether feedback of the HARQ acknowledgement information needs to be triggered. A value of the $i^{th}$ bit in the indication information is used to indicate whether feedback of the HARQ acknowledgement information needs to be triggered for a terminal with a terminal identifier of $ID_i$. When the value of the bit is "1", it indicates that feedback of the HARQ acknowledgement information needs to be triggered; when the value of the bit is "0", it indicates that feedback of the HARQ acknowledgement information does not need to be triggered. Alternatively, when the value of the bit is "0", it indicates that feedback of the HARQ acknowledgement information needs to be triggered; when the value of the bit is "1", it indicates that feedback of the HARQ acknowledgement information does not need to be triggered.
4. Process identifier information (process ID) of a physical downlink shared channel (PDSCH) transmission process, used to indicate a process ID for which feedback of the HARQ acknowledgement information is required.
5. Process identifier group information (process ID group) of PDSCH transmission processes, used to indicate a process identifier group for which feedback of the HARQ acknowledgement information is required.

The following embodiment further describes implementations of step 22 in combination with different scenarios.

Scenario 1: The information about the process identifier or the information about the process identifier group is not carried in the DCI.

Step 22 includes: in a case that the DCI indicates feeding back the HARQ acknowledgement information, feeding back all unreported HARQ acknowledgement information, or feeding back HARQ acknowledgement information for all PDSCH transmission processes.

When the DCI indicates triggering feedback of the HARQ acknowledgement information, the terminal feeds back all the unreported HARQ acknowledgement information on the indicated PUCCH resource. Alternatively, when the DCI indicates triggering feedback of the HARQ acknowledgement information, the terminal feeds back the HARQ acknowledgement information for all the PDSCH transmission processes on the indicated PUCCH resource.

Scenario 2: The information about the process identifier or the information about the process identifier group is carried in the DCI.

Step 22 includes: feeding back, based on a PDSCH transmission process indicated by the DCI, HARQ acknowledgement information corresponding to the PDSCH transmission process.

When the DCI indicates triggering feedback of the HARQ acknowledgement information, the terminal feeds back, on the indicated PUCCH resource, HARQ acknowledgement information corresponding to a PDSCH transmission process that is indicated by the information about the process identifier or information about the process identifier group in the DCI.

In the method for hybrid automatic repeat request (HARQ) feedback according to this embodiment of this disclosure, after the terminal misses a feedback location specified by the network device, feedback of the HARQ acknowledgement information can be still triggered according to the DCI, to ensure normal operation of a HARQ acknowledgement information feedback process. Further, the DCI is carried in the GC-PDCCH, so feedback of HARQ acknowledgement information can be triggered for a plurality of terminals simultaneously, reducing overheads for the DCI.

The foregoing embodiment describes the method for hybrid automatic repeat request (HARQ) feedback in different scenarios, and the following further describes a terminal corresponding to the method with reference to the accompanying drawings.

Figure 3:
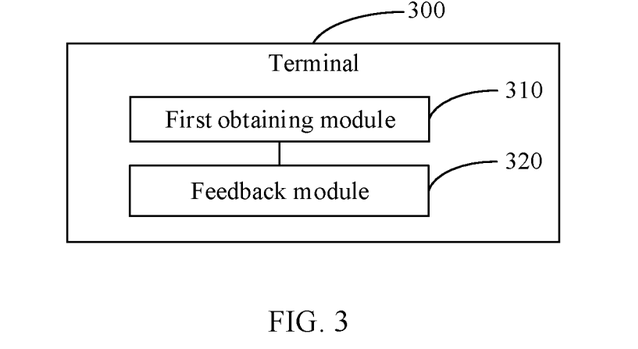
FIG. 3 is a schematic modular structural diagram of a terminal according to an embodiment of this disclosure.

As shown in FIG. 3, a terminal 300 in an embodiment of this disclosure is capable of implementing the steps of the foregoing embodiment: obtaining downlink control information (DCI) in a group common physical downlink control channel (GC-PDCCH), and feeding back HARQ acknowledgement information according to the DCI; and the same effects can be achieved. The terminal 300 specifically includes the following functional modules:

a first obtaining module 310, configured to obtain downlink control information (DCI) in a group common physical downlink control channel (GC-PDCCH); and a feedback module 320, configured to feed back HARQ acknowledgement information according to the DCI.

The first obtaining module 310 includes:

a first receiving sub-module, configured to receive, by using radio resource control (RRC) signalling, a radio network temporary identifier (RNTI) used for triggering feedback of the HARQ acknowledgement information; and a search sub-module, configured to search for corresponding DCI in the GC-PDCCH based on the RNTI.

The DCI includes at least one of the following information:

a quantity of time-domain transmission units between feedback of the HARQ acknowledgement information and the DCI;

physical uplink control channel (PUCCH) resource information for feeding back the HARQ acknowledgement information;

indication information of whether to trigger feeding back the HARQ acknowledgement information;

process identifier information of a physical downlink shared channel (PDSCH) transmission process; and process identifier group information of the PDSCH transmission process.

The terminal 300 further includes:

a determining module, configured to: in a case that a candidate PUCCH indicated by the PUCCH resource information in the DCI is in a special state with no configured resource, determine not to feed back the HARQ acknowledgement information.

The indication information is an n-bit bitmap, and n is a quantity of terminals corresponding to the GC-PUCCH.

The PUCCH resource information includes at least one of time information, frequency information, code domain information, and spatial information that are for feeding back the HARQ acknowledgement information.

The feedback module 320 includes one of the following:

a first feedback submodule, configured to: in a case that the DCI indicates feeding back the HARQ acknowledgement information, feed back all unreported HARQ acknowledgement information, or feed back HARQ acknowledgement information for all PDSCH transmission processes; and a second feedback submodule, configured to feed back, based on a PDSCH transmission process indicated by the DCI, HARQ acknowledgement information corresponding to the PDSCH transmission process.

It should be noted that after the terminal in this embodiment of this disclosure misses a feedback location specified by the network device, feedback of the HARQ acknowledgement information can be still triggered according to the DCI, to ensure normal operation of a HARQ acknowledgement information feedback process. Further, the DCI is carried in the GC-PDCCH, so feedback of HARQ acknowledgement information can be triggered for a plurality of terminals simultaneously, reducing overheads for the DCI.

Figure 4:
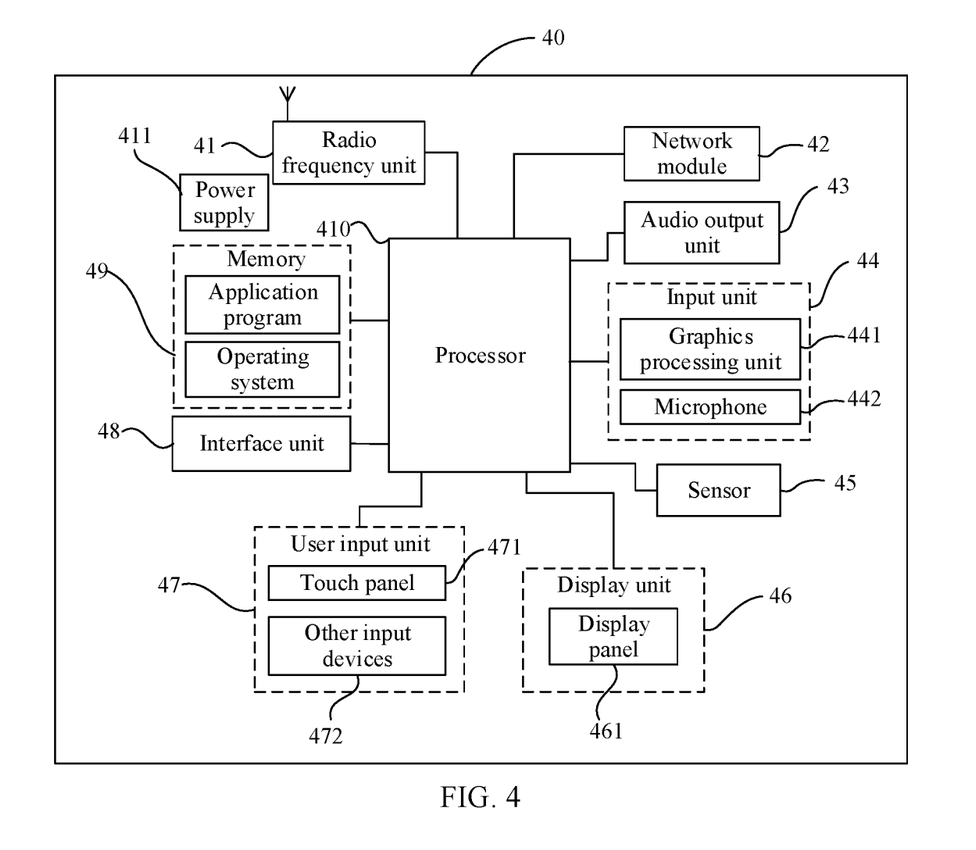
FIG. 4 is a block diagram of a terminal according to an embodiment of this disclosure.

To better achieve the foregoing objective, further, FIG. 4 is a schematic diagram of a hardware structure of a terminal for implementing the embodiments of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute any limitation on the terminal. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The radio frequency unit 41 is configured to obtain downlink control information (DCI) in a group common physical downlink control channel (GC-PDCCH); and feed back HARQ acknowledgement information according to the DCI.

The processor 410 is configured to control the radio frequency unit 41 to transmit and receive data.

After the terminal in this embodiment of this disclosure misses a feedback location specified by the network device, feedback of the HARQ acknowledgement information can be still triggered according to the DCI, to ensure normal operation of a HARQ acknowledgement information feedback process. Further, the DCI is carried in the GC-PDCCH, so feedback of HARQ acknowledgement information can be triggered for a plurality of terminals simultaneously, reducing overheads for the DCI.

It should be understood that in this embodiment of this disclosure, the radio frequency unit 41 may be configured to: receive and transmit signals in an information receiving/sending process or a call process; and specifically, after receiving downlink data from a base station, transmit the downlink information to the processor 410 for processing, and in addition, transmit uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may also communicate with a network and other devices via a wireless communications system.

The terminal provides a user with wireless broadband internet access through the network module 42, for example, helping the user to transmit and receive e-mails, browse web pages, and access streaming media.

The audio output unit 43 may convert audio data received by the radio frequency unit 41 or the network module 42 or stored in the memory 49 into an audio signal and output the audio signal as a sound. Furthermore, the audio output unit 43 may also provide audio output (for example, a call signal received sound or a message received sound) related to a specific function performed by the terminal 40. The audio output unit 43 includes a speaker, a buzzer, a receiver, and the like.

The input unit 44 is configured to receive an audio or video signal. The input unit 44 may include a graphics processing unit (GPU) 441 and a microphone 442. The graphics processing unit 441 processes image data of a still picture or video obtained by an image capture apparatus (such as a camera) in a video capture mode or an image capture mode. A processed image frame may be displayed on the display unit 46. The image frame processed by the graphics processing unit 441 may be stored in the memory 49 (or another storage medium) or be transmitted by the radio frequency unit 41 or the network module 42. The microphone 442 is capable of receiving sounds and processing such sounds into audio data. The processed audio data may be converted in a telephone call mode into a format that can be transmitted by the radio frequency unit 41 to a mobile communications base station, for outputting.

The terminal 40 may further include at least one sensor 45, for example, an optical sensor, a motion sensor, and another sensor. Specifically, the optical sensor may include an ambient light sensor and a proximity sensor. The ambient light sensor may adjust luminance of the display panel 461 based on brightness of ambient light, and the proximity sensor may turn off the display panel 461 and/or backlight when the terminal 40 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 45 may also include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided to the user. The display unit 46 may include a display panel 461, and the display panel 461 may be configured in a form of a liquid crystal display (LCD), an organic light-emitting diode (OLED), or the like.

The user input unit 47 may be configured to receive input digit or character information and generate key signal input related to user setting and function control of the mobile terminal. Specifically, the user input unit 47 may include a touch panel 471 and other input devices 472. The touch panel 471 is also referred to as a touchscreen and can collect a touch operation (such as an operation performed by the user on the touch panel 471 or near the touch panel 471 with a finger or by using any proper object or accessory such as a stylus) of the user on or near the touch panel 471. The touch panel 471 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 410, and can receive a command transmitted by the processor 410 and execute the command. In addition, the touch panel 471 may be implemented in a plurality of forms, for example, as a resistive, capacitive, infrared, or surface acoustic wave touch panel. In addition to the touch panel 471, the user input unit 47 may further include other input devices 472. Specifically, the other input devices 472 may include but are not limited to a physical keyboard, a function key (such as a volume control key or an on/off key), a trackball, a mouse, and a joystick. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides a corresponding visual output on the display panel 461 based on the type of the touch event. Although in FIG. 4, the touch panel 471 and the display panel 461 act as two independent parts to implement input and output functions of the terminal, in some embodiments, the touch panel 471 and the display panel 461 may be integrated to implement the input and output functions of the terminal. This is not specifically limited herein.

The interface unit 48 is an interface between an external apparatus and the terminal 40. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 48 may be configured to:

receive input (for example, data information and power) from the external apparatus, and transmit the received input to one or more elements in the terminal 40, or may be configured to transmit data between the terminal 40 and the external apparatus.

The memory 49 may be configured to store software programs and various data. The memory 49 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 49 may include a high-speed random access memory, and may further include a non-volatile memory such as at least one disk storage device, a flash memory device, or another volatile solid-state storage device.

The processor 410 is a control center of the terminal, and is connected to all components of the terminal by using various interfaces and lines. By running or executing a software program and/or module that is stored in the memory 49 and calling data stored in the memory 49, the processor 410 executes various functions of the terminal and processes data, so as to perform overall monitoring on the terminal. The processor 410 may include one or more processing units. Optionally, an application processor and a modem processor may be integrated in the processor 410. The application processor primarily processes an operating system, user interfaces, application programs, and the like. The modem processor primarily processes radio communication. It can be understood that the modem processor may alternatively be not integrated in the processor 410.

The terminal 40 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal 40 includes some functional modules that are not shown. Details are not described herein.

Optionally, an embodiment of this disclosure further provides a terminal, including a processor 410, a memory 49, and a computer program stored in the memory 49 and running on the processor 410. When the computer program is executed by the processor 410, the processes of the foregoing embodiment of the method for hybrid automatic repeat request (HARD) feedback can be implemented, with same technical effects achieved. To avoid repetition, details are not described herein again. A terminal may be a wireless terminal or a wired terminal, where the wireless terminal may be a device that provides a user with voice and/or other service data connectivity, a handheld device with a wireless connection function, or other processing devices connected to a wireless modem. A wireless terminal may communicate with one or more core networks through a radio access network (RAN). The wireless terminal may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network, such as a personal communication service (PCS) phone, a cordless phone, a session initiation protocol (SIP) phone set, a wireless local loop (WLL) station, or a personal digital assistant (PDA), or other devices. The wireless terminal may also be called a system, a subscriber unit, a subscriber station, a mobile station, a mobile station (Mobile), a remote station, a remote terminal, an access terminal, a user terminal, a user agent, or user equipment (User Device or User Equipment), which is not limited herein.

An embodiment of this disclosure further provides a computer-readable storage medium, where a computer program is stored in the computer readable storage medium. When the computer program is executed by a processor, the processes of the foregoing embodiment of the method for hybrid automatic repeat request (HARQ) feedback can be implemented, with same technical effects achieved. To avoid repetition, details are not described herein again. The computer-readable storage medium is, for example, a read-only memory (ROM), a random access memory (RAM), a magnetic disk, or an optical disc.

The foregoing embodiment describes the method for hybrid automatic repeat request (HARQ) feedback from the perspective of the terminal side in this disclosure. The following embodiment further describes a method for hybrid automatic repeat request (HARQ) feedback on a network device side with reference to the accompanying drawings.

Figure 5:
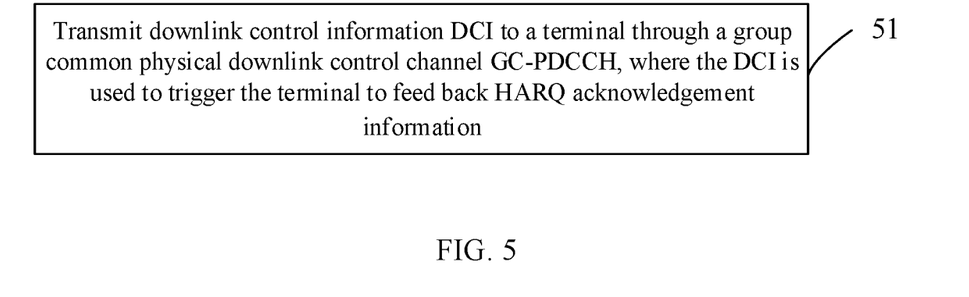
FIG. 5 is a schematic flowchart of a method for hybrid automatic repeat request (HARQ) feedback on a network device side according to an embodiment of this disclosure.

As shown in FIG. 5, a method for hybrid automatic repeat request (HARQ) feedback in this embodiment of this disclosure is applied to a network device side, and includes the following steps.

Step 51: Transmit downlink control information (DCI) to a terminal through a group common physical downlink control channel (GC-PDCCH), where the DCI is used to trigger the terminal to feed back HARQ acknowledgement information.

The GC-PDCCH may include: a feedback indication for the HARQ acknowledgement information, used to indicate whether a group of terminals are to feed back the HARQ acknowledgement information. The network device may indicate, by using the DCI in the GC-PDCCH, whether feeding back the HARQ acknowledgement information is triggered for a plurality of terminals. Correspondingly, the terminal decodes the DCI and determines whether feeding back the HARQ acknowledgement information is triggered, and if feeding back the HARQ acknowledgement information is triggered, the terminal feeds back the HARQ acknowledgement information on a corresponding PUCCH.

Before step 51, the following step is further included: transmitting, to the terminal by using radio resource control (RRC) signalling, a radio network temporary identifier (RNTI) for triggering feedback of the HARQ acknowledgement information, where the RNTI is associated with the DCI. The RRC signaling further includes: GC-PDCCH monitoring configuration information, such as a GC-PDCCH time-frequency resource. Correspondingly, the terminal may obtain the GC-PDCCH monitoring configuration information by receiving an RRC configuration. Based on the RRC signaling configuration, the terminal uses the RNTI configured in the RRC signaling to search for the corresponding DCI on the GC-PDCCH time-frequency resource.

Further, the RRC signaling may further include: a terminal identifier $ID_i$ in a terminal group and a maximum quantity n of terminals included in the terminal group. The terminal may determine a DCI size based on n, and correspondingly, the terminal may use the RNTI configured in the RRC signalling to search for DCI corresponding to the DCI size on the GC-PDCCH time-frequency resource.

The network device may further configure candidate PUCCH resource information by using RRC signaling. Optionally, the candidate physical uplink control channel (PUCCH) resource information carried in the RRC signaling supports a special state with no configured resource.

Further, the DCI in this embodiment of this disclosure may include but is not limited to at least one of the following information:

- a quantity of time-domain transmission units between feedback of the HARQ acknowledgement information and the DCI, such as a quantity K1 of slots between feedback of the HARQ acknowledgement information and the DCI;
- physical uplink control channel (PUCCH) resource information for feeding back the HARQ acknowledgement information, where the DCI in the GC-PUCCH may carry PUCCH resource information for feeding back HARQ acknowledgement information by each terminal in the terminal group, where the PUCCH resource information herein includes but is not limited to: at least one of a time-domain resource, a frequency-domain resource, a code-domain resource, and a spatial resource that are for feeding back the HARQ acknowledgement information; further, the terminal may determine, based on the PUCCH resource information in the DCI, whether feeding back the HARQ acknowledgement information is triggered, and such indication manner is an implicit indication manner; for example, when duration of a candidate PUCCH indicated by the PUCCH resource information in the DCI is 0, it indicates that the terminal does not feed back the HARQ acknowledgement information; and when duration of a candidate PUCCH indicated by the PUCCH resource information in the DCI is not 0, it indicates that the terminal feeds back the HARQ acknowledgement information on the indicated PUCCH;
- indication information of whether to trigger feeding back the HARQ acknowledgement information, where correspondingly, the terminal may determine, based on an indication of the indication information, whether feedback of the HARQ acknowledgement information needs to be triggered, and such indication manner is an explicit indication manner; as an example, the indication information may be an n-bit bitmap, and n is a quantity of terminals corresponding to the GC-PUCCH, where a value of the $i^{th}$ bit in the indication information is used to indicate whether feedback of the HARQ acknowledgement information needs to be triggered for a terminal with a terminal identifier of $ID_i$;
- process identifier information of a physical downlink shared channel (PDSCH) transmission process, used to indicate a process ID for which feedback of the HARQ acknowledgement information is required; and
- process identifier group information of PDSCH transmission processes, used to indicate a process identifier group for which feedback of the HARQ acknowledgement information is required.

In the method for hybrid automatic repeat request (HARQ) feedback according to this embodiment of this disclosure, the network device may trigger, by using the DCI, the terminal to feed back the HARQ acknowledgement information, thereby ensuring that feedback of the HARQ acknowledgement information can be still triggered according to the DCI even after the terminal misses a feedback location specified by the network device. Further, the DCI is carried in the GC-PDCCH, so feedback of HARQ acknowledgement information can be triggered for a plurality of terminals simultaneously, reducing overheads for the DCI.

The foregoing embodiment describes in detail the method for hybrid automatic repeat request (HARQ) feedback in different scenarios, and the following embodiment further describes a network device corresponding to the method with reference to the accompanying drawings.

Figure 6:
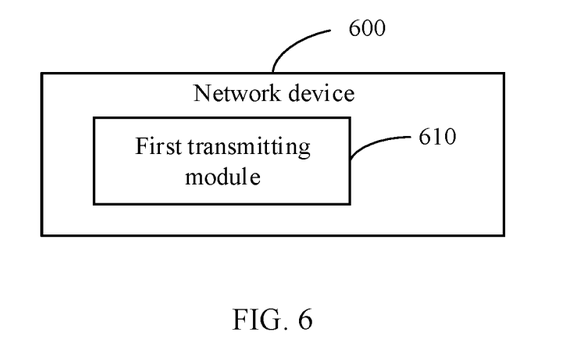
FIG. 6 is a schematic modular structural diagram of a network device according to an embodiment of this disclosure.

As shown in FIG. 6, a network device 600 in an embodiment of this disclosure is capable of implementing the details of the foregoing method embodiment: transmitting downlink control information (DCI) to a terminal through a group common physical downlink control channel (GC-PDCCH), where the DCI is used to trigger the terminal to feed back HARQ acknowledgement information; and the same effects can be achieved. The network device 600 specifically includes the following functional module:

- a first transmitting module 610, configured to transmit downlink control information (DCI) to a terminal through a group common physical downlink control channel (GC-PDCCH), where the DCI is used to trigger the terminal to feed back HARQ acknowledgement information.

The network device 600 further includes:

- a second transmitting module, configured to transmit, to the terminal by using radio resource control (RRC) signalling, a radio network temporary identifier (RNTI) for triggering feedback of the HARQ acknowledgement information, where the RNTI is associated with the DCI.

Candidate physical uplink control channel (PUCCH) resource information carried in the RRC signaling supports a special state with no configured resource.

The DCI includes at least one of the following information:

- a quantity of time-domain transmission units between feedback of the HARQ acknowledgement information and the DCI;
- physical uplink control channel (PUCCH) resource information for feeding back the HARQ acknowledgement information;
- indication information of whether to trigger feeding back the HARQ acknowledgement information;
- process identifier information of a physical downlink shared channel (PDSCH) transmission process; and
- process identifier group information of the PDSCH transmission process.

The indication information is an n-bit bitmap, and n is a quantity of terminals corresponding to the GC-PUCCH.

The PUCCH resource information includes at least one of time information, frequency information, code domain information, and spatial information that are for feeding back the HARQ acknowledgement information.

It should be noted that the network device in this embodiment of this disclosure may trigger, by using the DCI, the terminal to feed back the HARQ acknowledgement information, thereby ensuring that feedback of the HARQ acknowledgement information can be still triggered according to the DCI even after the terminal misses a feedback location specified by the network device. Further, the DCI is carried in the GC-PDCCH, so feedback of HARQ acknowledgement information can be triggered for a plurality of terminals simultaneously, reducing overheads for the DCI.

It should be noted that, it should be understood that division of modules of the network device and the terminal is merely logical function division. The modules may be all or partially integrated in a physical entity or may be physically separate in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the modules may be configured as one or more integrated circuits for implementing the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by the processing component, the processing component may be a general processor, for example, a central processing unit (CPU) or other processors that may invoke program code. For another example, the modules may be integrated and implemented in a form of a system-on-a-chip (SOC).

To better achieve the foregoing objective, an embodiment of this disclosure further provide a network device. The network device includes a processor, a memory, and a computer program stored in the memory and capable of running on the processor. When the computer program is executed by the processor, the steps of the foregoing method for hybrid automatic repeat request (HARQ) feedback are implemented. An embodiment of the present invention further provides a computer-readable storage medium, where the computer-readable storage medium stores a computer program, and when the computer program is executed by a processor, the steps of the foregoing method for hybrid automatic repeat request (HARQ) feedback are implemented.

Figure 7:
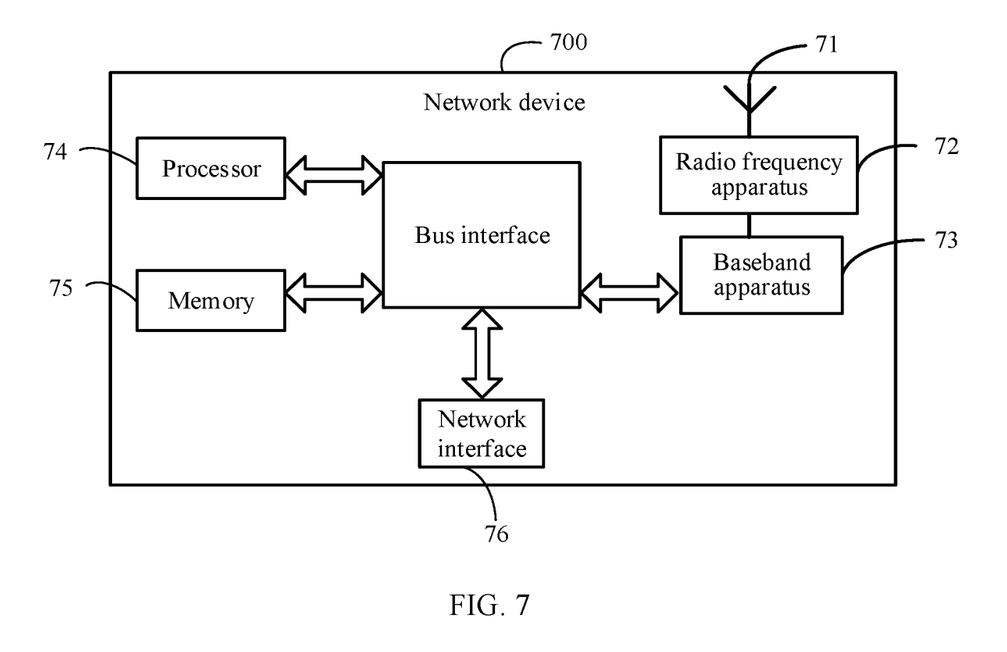
FIG. 7 is a block diagram of a network device according to an embodiment of this disclosure.

Specifically, an embodiment of this disclosure further provides a network device. As shown in FIG. 7, the network device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The frequency band processing apparatus may be located in the baseband apparatus 73. The method performed by the network device in the foregoing embodiments may be implemented in the baseband apparatus 73, and the baseband apparatus 73 includes a processor 74 and a memory 75.

The baseband apparatus 73 may include, for example, at least one baseband board, where a plurality of chips are disposed on the baseband board. As shown in FIG. 7, one of the chips, for example, the processor 74, is connected to the memory 75, to invoke a program in the memory 75 to perform the operation of the network device shown in the foregoing method embodiments.

The baseband apparatus 73 may further include a network interface 76, configured to exchange information with the radio frequency apparatus 72, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 75 described in this application is intended to include but is not limited to these and any other suitable types of memories.

Specifically, the network device in the embodiments of this disclosure further includes a computer program stored in the memory 75 and capable of running on the processor 74. The processor 74 invokes the computer program in the memory 75 to perform the method performed by the modules shown in FIG. 6.

Specifically, when the computer program is invoked by the processor 74, the following can be executed: transmitting downlink control information (DCI) to a terminal through a group common physical downlink control channel (GC-PDCCH), where the DCI is used to trigger the terminal to feed back HARQ acknowledgement information.

The network device in this embodiment of this disclosure may trigger, by using the DCI, the terminal to feed back the HARQ acknowledgement information, thereby ensuring that feedback of the HARQ acknowledgement information can be still triggered according to the DCI even after the terminal misses a feedback location specified by the network device. Further, the DCI is carried in the GC-PDCCH, so feedback of HARQ acknowledgement information can be triggered for a plurality of terminals simultaneously, reducing overheads for the DCI.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of a computing apparatus. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are optional implementations of this disclosure. It should be noted that a person of ordinary skill in the art may make several improvements and polishing without departing from the principle described in this disclosure and the improvements and polishing shall fall within the protection scope of this disclosure.

What is claimed is:

1. A method for hybrid automatic repeat request (HARQ) feedback, comprising:
   obtaining, by a terminal, downlink control information (DCI) in a group common physical downlink control channel (GC-PDCCH); and
   feeding back, by the terminal, HARQ acknowledgement information according to the DCI;
   wherein the DCI comprises at least one of the following information:
   a quantity of time-domain transmission units between feedback of the HARQ acknowledgement information and the DCI;
   process identifier information of a physical downlink shared channel (PDSCH) transmission process; or
   process identifier group information of the PDSCH transmission process;
   wherein the step of feeding back HARQ acknowledgement information according to the DCI comprises: in a case that the DCI indicates feeding back the HARQ acknowledgement information, feeding back all unreported HARQ acknowledgement information, or feeding back HARQ acknowledgement information for all PDSCH transmission processes;
   wherein the step of obtaining DCI in a group common physical downlink control channel (GC-PDCCH) comprises:
   receiving, by using radio resource control (RRC) signalling, a radio network temporary identifier (RNTI) used for triggering feedback of the HARQ acknowledgement information; and
   searching for corresponding DCI in the GC-PDCCH based on the RNTI;

wherein the DCI further comprises indication information of whether to trigger feeding back the HARQ acknowledgement information;
wherein the indication information is an n-bit bitmap, and n is a quantity of terminals corresponding to the GC-PUCCH;
wherein the searching for corresponding DCI in the GC-PDCCH based on the RNTI, comprises:
determining a DCI size based on n, and using the RNTI to search for DCI corresponding to the DCI size in the GC-PDCCH.

2. The method for HARQ feedback according to claim 1, wherein the DCI further comprises:
a physical uplink control channel (PUCCH) resource information for feeding back the HARQ acknowledgement information.

3. The method for HARQ feedback according to claim 2, after the step of obtaining DCI in a GC-PDCCH, further comprising:
in a case that a candidate PUCCH indicated by the PUCCH resource information in the DCI is in a special state with no configured resource, determining not to feed back the HARQ acknowledgement information.

4. The method for HARQ feedback according to claim 2, wherein the PUCCH resource information comprises at least one of time information, frequency information, code domain information, and spatial information that are for feeding back the HARQ acknowledgement information.

5. The method for HARQ feedback according to claim 1, wherein the step of feeding back HARQ acknowledgement information according to the DCI further comprises:
feeding back, based on a PDSCH transmission process indicated by the DCI, HARQ acknowledgement information corresponding to the PDSCH transmission process.

6. A terminal, comprising a processor, a memory, and a computer program stored in the memory and capable of running on the processor, wherein when the computer program is executed by the processor, following steps are implemented:
obtaining downlink control information (DCI) in a group common physical downlink control channel (GC-PDCCH); and
feeding back HARQ acknowledgement information according to the DCI;
wherein the DCI comprises at least one of the following information:
a quantity of time-domain transmission units between feedback of the HARQ acknowledgement information and the DCI;
process identifier information of a physical downlink shared channel (PDSCH) transmission process; or
process identifier group information of the PDSCH transmission process;
wherein the step of feeding back HARQ acknowledgement information according to the DCI comprises: in a case that the DCI indicates feeding back the HARQ acknowledgement information, feeding back all unreported HARQ acknowledgement information, or feeding back HARQ acknowledgement information for all PDSCH transmission processes;
wherein when obtaining DCI in a group common physical downlink control channel (GC-PDCCH), the processor is used to perform:
receiving, by using radio resource control (RRC) signalling, a radio network temporary identifier (RNTI) used for triggering feedback of the HARQ acknowledgement information; and
searching for corresponding DCI in the GC-PDCCH based on the RNTI;
wherein the DCI further comprises indication information of whether to trigger feeding back the HARQ acknowledgement information;
wherein the indication information is an n-bit bitmap, and n is a quantity of terminals corresponding to the GC-PUCCH;
wherein when searching for corresponding DCI in the GC-PDCCH based on the RNTI, the processor is used to perform:
determining a DCI size based on n, and using the RNTI to search for DCI corresponding to the DCI size in the GC-PDCCH.

7. The terminal according to claim 6, wherein the DCI further comprises:
a physical uplink control channel (PUCCH) resource information for feeding back the HARQ acknowledgement information.

8. The terminal according to claim 7, wherein when the computer program is executed by the processor, after the step of obtaining DCI in a GC-PDCCH, following step is further implemented:
in a case that a candidate PUCCH indicated by the PUCCH resource information in the DCI is in a special state with no configured resource, determining not to feed back the HARQ acknowledgement information.

9. The terminal according to claim 7, wherein the PUCCH resource information comprises at least one of time information, frequency information, code domain information, and spatial information that are for feeding back the HARQ acknowledgement information.

10. The terminal according to claim 6, wherein when feeding back HARQ acknowledgement information according to the DCI, the processor is used to perform:
feeding back, based on a PDSCH transmission process indicated by the DCI, HARQ acknowledgement information corresponding to the PDSCH transmission process.

11. A network device, wherein the network device comprises a processor, a memory, and a computer program stored in the memory and capable of running on the processor, and when the computer program is executed by the processor, following step is implemented:
transmitting downlink control information (DCI) to a terminal through a group common physical downlink control channel (GC-PDCCH), wherein the DCI is used to trigger the terminal to feed back HARQ acknowledgement information;
wherein the DCI comprises at least one of the following information:
a quantity of time-domain transmission units between feedback of the HARQ acknowledgement information and the DCI;
process identifier information of a physical downlink shared channel (PDSCH) transmission process; or
process identifier group information of the PDSCH transmission process;
wherein the step of feeding back HARQ acknowledgement information according to the DCI comprises: in a case that the DCI indicates feeding back the HARQ acknowledgement information, feeding back all unreported HARQ acknowledgement information, or feeding back HARQ acknowledgement information for all PDSCH transmission processes;

wherein when the computer program is executed by the processor, before the step of transmitting DCI to a terminal through a GC-PDCCH, following step is further implemented:

transmitting, to the terminal by using radio resource control (RRC) signalling, a radio network temporary identifier (RNTI) for triggering feedback of the HARQ acknowledgement information, wherein the RNTI is associated with the DCI;

wherein the DCI further comprises indication information of whether to trigger feeding back the HARQ acknowledgement information;

wherein the indication information is an n-bit bitmap, and n is a quantity of terminals corresponding to the GC-PUCCH and used for determining a DCI size, and the RNTI is further used for searching for DCI corresponding to the DCI size in the GC-PDCCH.

12. The network device according to claim 11, wherein candidate physical uplink control channel (PUCCH) resource information carried in the RRC signaling supports a special state with no configured resource.

13. The network device according to claim 11, wherein the DCI further comprises:

physical uplink control channel (PUCCH) resource information for feeding back the HARQ acknowledgement information.

14. The network device according to claim 13, wherein the PUCCH resource information comprises at least one of time information, frequency information, code domain information, and spatial information that are for feeding back the HARQ acknowledgement information.

* * * * *